(12) United States Patent
Dewulf et al.

(10) Patent No.: US 10,090,491 B2
(45) Date of Patent: Oct. 2, 2018

(54) ELECTROCHEMICAL ACCUMULATOR WITH HOUSING AND OUTPUT TERMINAL MADE OF ALUMINIUM ALLOY

(71) Applicant: COMMISSARIAT A L'ENERGIE ATOMIQUE ET AUX ENERGIES ALTERNATIVES, Paris (FR)

(72) Inventors: Frédéric Dewulf, Voiron (FR);
Marianne Chami, Fontaine (FR);
Come-Emmanuel Leys, Grenoble (FR);
Olivier Masson, Grenoble (FR); Pierre Jost, Saint-Pierre de Mesage (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 40 days.

(21) Appl. No.: 15/112,405

(22) PCT Filed: Jan. 14, 2015

(86) PCT No.: PCT/IB2015/050276
§ 371 (c)(1),
(2) Date: Jul. 18, 2016

(87) PCT Pub. No.: WO2015/107464
PCT Pub. Date: Jul. 23, 2015

(65) Prior Publication Data
US 2016/0336546 A1    Nov. 17, 2016

(30) Foreign Application Priority Data

Jan. 16, 2014 (FR) .................................... 14 50346

(51) Int. Cl.
*H01M 2/02* (2006.01)
*H01M 2/06* (2006.01)
(Continued)

(52) U.S. Cl.
CPC ............. *H01M 2/027* (2013.01); *B23K 26/22* (2013.01); *B23K 26/322* (2013.01);
(Continued)

(58) Field of Classification Search
CPC ...... H01M 2/027; H01M 2/0285; H01M 2/06; H01M 2/105; H01M 2/20; H01M 2/202;
(Continued)

(56) References Cited

U.S. PATENT DOCUMENTS 5,856,041 A * 1/1999 Inoue ...................... H01M 2/06
429/182
6,521,374 B1 * 2/2003 Nakanishi ............... H01M 2/06
429/163

(Continued)

FOREIGN PATENT DOCUMENTS

EP   1 653 530 A1   5/2006
EP   2 445 035 A1   4/2012
(Continued)

OTHER PUBLICATIONS

Craig et al., Handbook of Corrosion Data, Dec. 31, 1995, pp. 16-19.
(Continued)

*Primary Examiner* — Brittany L Raymond
(74) *Attorney, Agent, or Firm* — Oliff PLC

(57) ABSTRACT

An electrochemical accumulator including: at least one electrochemical cell made of at least one cathode and one anode and, on either side of an electrolyte, two current collectors, one of which is connected to the anode and the other to the cathode; a housing made of aluminium alloy arranged such as to sealingly contain the electrochemical cell(s); two current-output terminals, one of which is welded to a wall of the housing, the output terminal welded to the housing being made of an aluminium alloy having a magnesium content (Mg) that is no lower than 0.01% and no
(Continued)

higher than 4%, and a copper content that is no lower than 0.05% and no higher than 0.3%, the aluminium alloy of the output terminal welded to the housing having a metallurgical state which grants same a breaking strength (Rm) of no less than 60 MPa.

14 Claims, 4 Drawing Sheets

(51) Int. Cl.

| | | |
|---|---|---|
| *H01M 2/20* | (2006.01) | |
| *H01M 2/10* | (2006.01) | |
| *H01M 2/26* | (2006.01) | |
| *H01M 10/058* | (2010.01) | |
| *H01M 10/0525* | (2010.01) | |
| *B23K 26/323* | (2014.01) | |
| *B23K 26/22* | (2006.01) | |
| *B23K 26/322* | (2014.01) | |
| *H01M 2/30* | (2006.01) | |
| *H01M 10/052* | (2010.01) | |
| *B23K 103/16* | (2006.01) | |
| *B23K 101/38* | (2006.01) | |
| *B23K 103/10* | (2006.01) | |
| *B23K 103/12* | (2006.01) | |
| *B23K 103/18* | (2006.01) | |
| *B23K 103/08* | (2006.01) | |

(52) U.S. Cl.
CPC ......... *B23K 26/323* (2015.10); *H01M 2/0285* (2013.01); *H01M 2/06* (2013.01); *H01M 2/105* (2013.01); *H01M 2/20* (2013.01); *H01M 2/202* (2013.01); *H01M 2/26* (2013.01); *H01M 2/30* (2013.01); *H01M 10/058* (2013.01); *H01M 10/0525* (2013.01); *B23K 2201/38* (2013.01); *B23K 2203/08* (2013.01); *B23K 2203/10* (2013.01); *B23K 2203/12* (2013.01); *B23K 2203/166* (2015.10); *B23K 2203/18* (2013.01); *H01M 10/052* (2013.01)

(58) Field of Classification Search
CPC ........ H01M 2/26; H01M 2/30; H01M 10/052; H01M 10/0525; H01M 10/058; B23K 26/323; B23K 26/322; B23K 26/22; B23K 2203/08; B23K 2203/10; B23K 2203/12; B23K 2203/18; B23K 2203/166; B23K 2201/38
See application file for complete search history.

(56) References Cited

U.S. PATENT DOCUMENTS

| | | | |
|---|---|---|---|
| 7,335,448 B2 | 2/2008 | Kaito et al. | |
| 7,338,733 B2 | 3/2008 | Morita et al. | |
| 7,348,098 B2 | 3/2008 | Hayashi et al. | |
| 2006/0121348 A1 | 6/2006 | Mizutani et al. | |
| 2008/0057392 A1 | 3/2008 | Takamatsu et al. | |
| 2008/0060189 A1 | 3/2008 | Daidoji et al. | |
| 2013/0224536 A1 | 8/2013 | Hattori et al. | |
| 2013/0244090 A1* | 9/2013 | Tanaka ................ | H01M 10/04 429/176 |
| 2013/0330599 A1* | 12/2013 | Kroll ................... | C03C 3/19 429/163 |
| 2015/0023392 A1* | 1/2015 | Noh .................... | G01K 7/22 374/185 |
| 2015/0228957 A1* | 8/2015 | Jeong .................. | B23K 31/02 429/158 |

FOREIGN PATENT DOCUMENTS

| | | |
|---|---|---|
| JP | 2003-223885 A | 8/2003 |
| JP | 2007-103352 A | 4/2007 |

OTHER PUBLICATIONS

Ghali, Edward, Corrosion Resistance of Aluminum and Magnesium Alloys: Understanding, Performance, and Testing, Dec. 31, 2010, John Wiley & Sons, Inc., pp. 124-141.

Oct. 16, 2014 Search Report issued in French Patent Application No. 1450346.

Apr. 17, 2015 International Search Report issued in International Patent Application No. PCT/IB2015/050276.

* cited by examiner

Fig.6
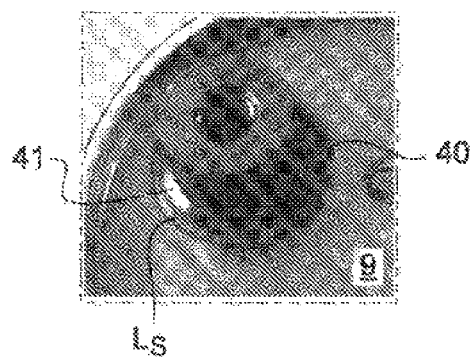
Fig.6A
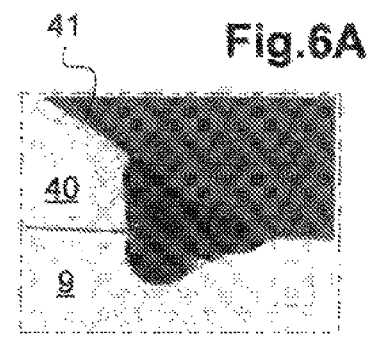
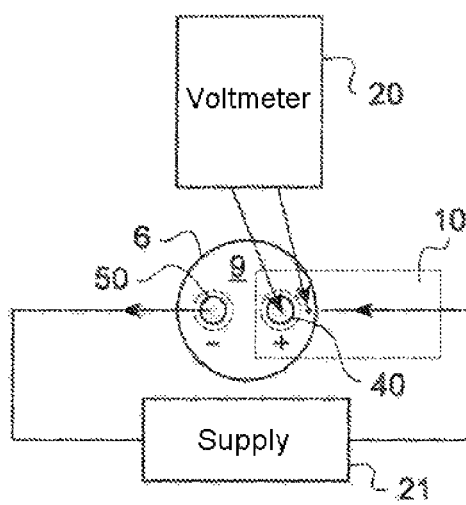
Fig.7
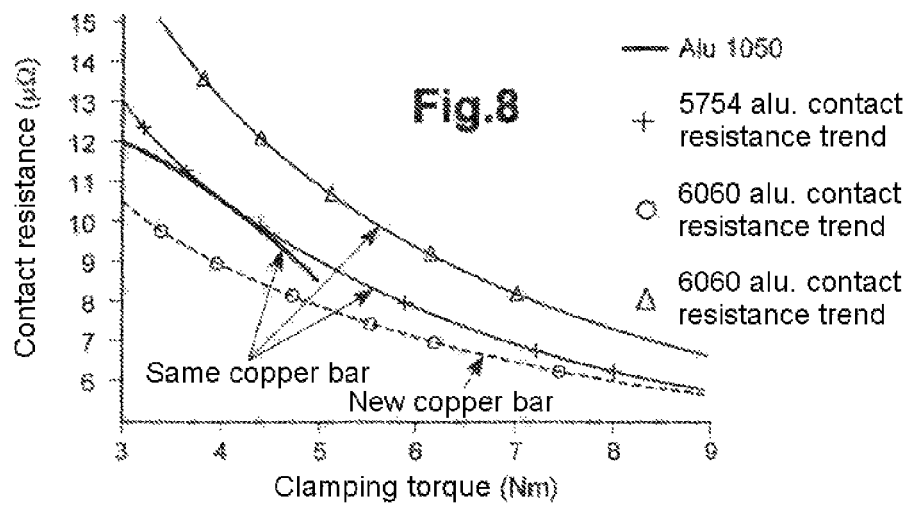
Fig.8

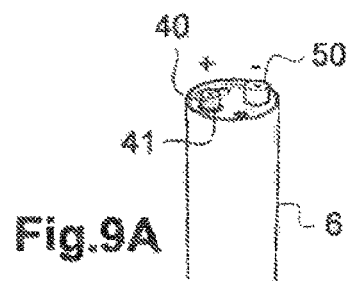
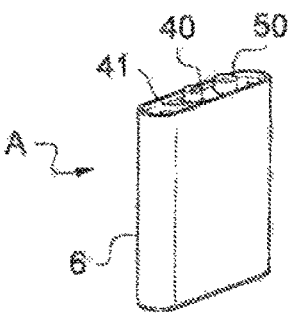
Fig.9A  Fig.9B
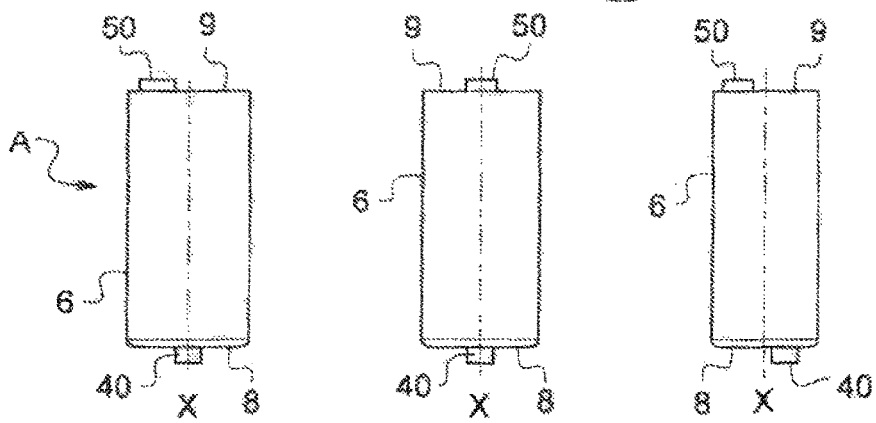
Fig.10A  Fig.10B  Fig.10C
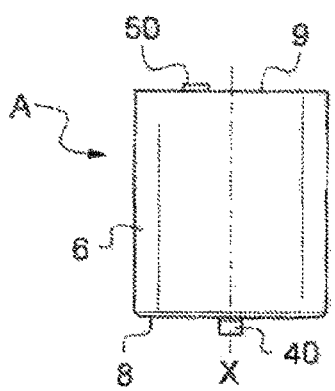
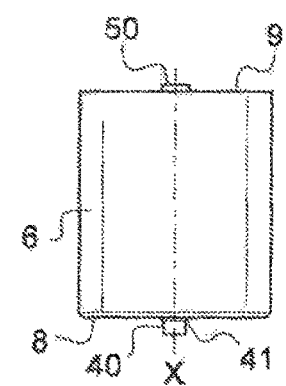
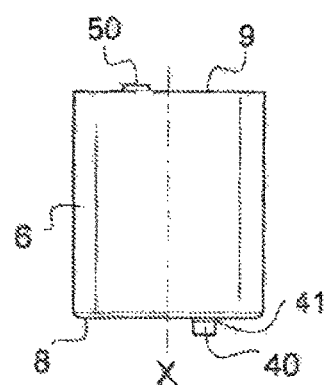
Fig.11A  Fig.11B  Fig.11C
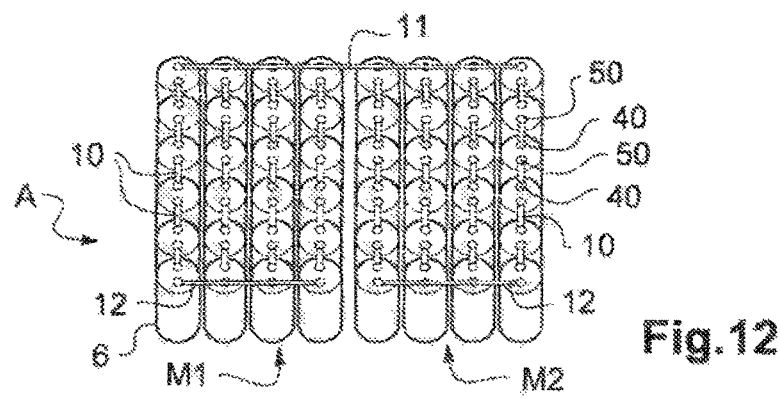
Fig.12

ELECTROCHEMICAL ACCUMULATOR WITH HOUSING AND OUTPUT TERMINAL MADE OF ALUMINIUM ALLOY

TECHNICAL FIELD

The present invention relates to the field of electrochemical generators that function according to the principal of insertion or deinsertion, or in other words intercalation-deintercalation, of ions in at least one electrode.

It more particularly relates to an electrochemical accumulator including at least one electrochemical cell consisting of at least one anode and one cathode on either side of an electrolyte, two current collectors one of which is connected to the anode and the other to the cathode, and a casing made of aluminum alloy arranged to contain the electrochemical cell(s) with seal tightness while being passed through by a portion of the current collectors forming all or some of the current output terminals or poles.

The aim of the invention is to provide a way of producing an output terminal on a casing made of aluminum, which makes it possible to ensure the mechanical and electrical connection thereof with an aluminum- or copper-based metal strip, commonly called a bus bar, in order to produce an interconnection with at least one other accumulator casing with a view to forming a battery pack.

The main application targeted by the invention is the production of Li-ion accumulators.

Although described below with reference to the main application, the invention also applies to any other electrochemical accumulator comprising a casing made of aluminum alloy.

The aluminum-alloy grades indicated and claimed in the scope of the present invention are those used in the international system for designating wrought aluminum alloys i.e. those intended to be transformed by forging techniques (hot rolling, extrusion, drop forging, forging, etc.) or by machining. In this reference system each alloy is given a four-digit number defining its grade, the first digit indicating the major alloy elements.

The screw diameters indicated in the context of the present invention for clamping by screwing into the tapped threads of a current output terminal are those using the symbols of the ISO metric screw thread designation.

PRIOR ART

Such as schematically illustrated in FIGS. 1 and 2, a lithium-ion accumulator or battery usually includes at least one electrochemical cell C consisting of a separator impregnated with a constituent electrolyte 1 between a positive electrode or cathode 2 and a negative electrode or anode 3, a current collector 4 connected to the cathode 2, a current collector 5 connected to the anode 3 and, lastly, a package 6 arranged to contain the electrochemical cell with seal tightness while being passed through by a portion of the current collectors 4, 5 forming the two current output terminals.

The architecture of conventional lithium-ion batteries is an architecture that may be qualified as monopolar, because it has a single electrochemical cell including an anode, a cathode and an electrolyte. A number of types of monopolar architecture geometry are known:

a cylindrical geometry such as disclosed in patent application US 2006/0121348;
a prismatic geometry such as disclosed in U.S. Pat. No. 7,348,098 and U.S. Pat. No. 7,338,733; and
a stacked geometry such as disclosed in patent applications US 2008/060189 and US 2008/0057392 and U.S. Pat. No. 7,335,448.

The constituent electrolyte may be a solid, liquid or gel. In the latter form, the constituent may comprise a separator made of a polymer or microporous composite imbibed with organic or liquid-ionic electrolyte(s) that allow lithium ions to move from the cathode to the anode for a charge and vice versa for a discharge, thereby generating the current. The electrolyte is in general a mixture of organic solvents, for example of carbonates, to which a lithium salt, typically $LiPF_6$, is added.

The positive electrode or cathode consists of insertion materials of the lithium cation which are in general composites, such as lithium iron phosphate $LiFePO_4$, lithium cobalt oxide $LiCoO_2$, optionally substituted lithium manganese oxide $LiMn_2O_4$ or a material based on $LiNi_xMn_yCo_zO_2$ where $x+y+z=1$, such as $LiNi_{0.33}Mn_{0.33}CO_{0.33}O_2$, or a material based on $LiNi_xCo_yAl_zO_2$ where $x+y+z=1$, $LiMn_2O_4$, $LiNiMnCoO_2$ or lithium nickel cobalt aluminum oxide $LiNiCoAlO_2$.

The negative electrode or anode very often consists of carbon, graphite or is made of $Li_4TiO_5O_{12}$ (titanate material), though also optionally is based on silicon or based on lithium, or based on tin and alloys thereof or on a silicon-based composite.

The anode and the cathode made of lithium insertion material may be deposited using a conventional technique in the form of an active layer on a metal sheet forming a current collector.

The current collector connected to the positive electrode is in general made of aluminum.

The current collector connected to the negative electrode is in general made of copper, of nickel-coated copper or of aluminum.

Conventionally, an Li-ion accumulator or battery uses a pair of materials at the anode and at the cathode that allow it to operate at a high voltage level, typically about 3.6 volts.

An Li-ion accumulator or battery includes a rigid packaging or casing when the targeted applications are constraining, when for example very high pressures are to be withstood and a stricter seal-tightness level (typically lower than $10^{-6}$ mbar·1/s helium) is required, or a long lifetime is sought, or in highly constraining environments such as in the spatial or aeronautic field. The main advantage of rigid packagings is that their high seal tightness is maintained over time because the casings are closed by welding, in general by laser welding.

The geometry of most rigid packaging casings of Li-ion accumulators is cylindrical, because most accumulator electrochemical cells are wound by spooling into a cylindrical geometry. Casings of prismatic shapes have also already been produced.

One of the types of cylindrically shaped rigid casings usually manufactured for high-capacity Li-ion accumulators of lifetime longer than ten years is illustrated in FIG. 3.

The casing 6, of longitudinal axis X, includes a container comprising a cylindrical lateral jacket 7 and a bottom 8 at one end, and a cover 9 at the other end. The cover 9 bears the terminals or poles 40, 50 through which the current is output. One of the output terminals (poles), for example the positive terminal 40, is welded to the cover 9, whereas the other output terminal, for example the negative terminal 50, passes through the cover 9 with interposition of a seal (not shown) that electrically insulates the negative terminal 50 from the cover.

Usually, the container and the cover of an Li-ion accumulator casing are produced from a grade 1050 aluminum alloy containing 99.5% aluminum.

Again usually, the positive output terminal of an Li-ion accumulator is produced from grade 1050 aluminum alloy in order to ensure the best welding compatibility with the cover.

The integration of Li-ion accumulators into modules to form a battery pack, especially for power applications, involves electrically interconnecting the accumulators with aluminum- or copper-based metal strips (bus bars).

One reliable mechanical solution for mechanically and electrically connecting the positive and negative terminals of an Li-ion accumulator to a strip made of copper or aluminum of a bus bar is screwing. However, this is only possible if the yield strength of the material employed for each of the terminals allows clamping at a high torque, typically higher than 4 N·m for clamping with an M5 screw, in order to ensure the force and area of contact between the terminal and the bus bar is sufficient to pass the required current via the charging/discharging accumulator in operation of the battery pack.

To solve this problem, the inventors of the invention disclosed in patent application EP 1 653 530 A1 were clearly dissuaded from producing terminals from any sort of aluminum in particular because such terminals do not have a sufficient rigidity and because too high a screwing torque applied to their thread would damage the latter. Reference may especially be made to paragraphs [006] and [007] of this prior-art application. Thus, the inventors proposed, in this prior-art application, an Li-ion accumulator casing, the two current output terminals of which, supported by the cover, are made of copper, each terminal having a shoulder allowing it either to be laser welded to the cover or to be crimp-fastened to the latter. However, the cost of such a solution is high especially because copper is used to produce the terminals.

There is therefore a need to improve the production of at least one output terminal of an electrochemical accumulator comprising a casing made of aluminum alloy, especially with a view to allowing a reliable electrical and mechanical connection to a metal strip, referred to as a bus bar, at lower cost.

There is in particular a need to improve the production of a positive output terminal of an Li-ion accumulator comprising a casing made of aluminum alloy.

The aim of the invention is to at least partially meet this (these) need(s).

SUMMARY OF THE INVENTION

To do this, the subject of the invention, according to one of its aspects, is an electrochemical accumulator including:
- at least one electrochemical cell consisting of at least one cathode and one anode and on either side of an electrolyte, two current collectors one of which is connected to the anode and the other to the cathode,
- a casing made of aluminum alloy, arranged to contain the electrochemical cell(s) with seal tightness,
- two current output terminals one of which is welded to a wall of the casing, the output terminal welded to the casing being made of an aluminum-based alloy comprising a magnesium (Mg) content higher than or equal to 0.01% and lower than or equal to 4%, and a copper content higher than or equal to 0.05% and lower than or equal to 0.3%, the aluminum alloy of the output terminal welded to the casing having a metallurgical state providing it with a yield strength (Rm) higher than or equal to 160 MPa.

Preferably, the Mg content is lower than or equal to 3%. Thus alloys that are liable to crack are avoided.

The expression "aluminum-based alloy" is understood to mean an alloy comprising almost entirely aluminum, with, depending on the circumstances, other elements, such as Si, Mn, Zn, Fe and Ti, in small proportions typically lower than 0.5%.

According to a first advantageous embodiment, the aluminum alloy of the output terminal welded to the casing is a 3003 grade with an $H_{18}$ temper. For such a 3003 grade the Mg content may advantageously be comprised between 0.01 and 0.05%, and the copper (Cu) content comprised between 0.05 and 0.2%.

According to a second advantageous embodiment, the aluminum alloy of the output terminal welded to the casing is a 5754 grade. For such a 5754 grade, the Mg content may advantageously be comprised between 2.6 and 3.2%, and the copper (Cu) content comprised between 0.05 and 0.1%.

According to a third advantageous embodiment, the aluminum alloy of the output terminal welded to the casing is a 6060 grade. For such a 6060 grade, the Mg content may advantageously be comprised between 0.35 and 0.6%, and the copper (Cu) content comprised between 0.05 and 0.1%.

Compared to current output terminals according to the prior art, the output terminals according to the invention are of lower cost, the market price of aluminum as a raw material being, at the present time, about four times lower than that of copper and eight times lower than that of nickel.

Moreover, because of its high mechanical rigidity, screw threads tapped into an output terminal according to the invention are not liable to be damaged when a metal strip (bus bar) enabling interconnection with another accumulator is mounted/demounted a plurality of times, typically more than twice.

Furthermore, the high yield strength of an output terminal according to the invention makes it possible to be able to apply, by screwing between it and a bus bar, a clamping torque that is equivalent or even higher than that appliable to a copper-based terminal according to the prior art. Typically, the clamping torque that may be applied by screwing to an output terminal according to the invention is higher than 4 N.m.

Among the aluminum alloys that may be used in the context of the invention, the 5754 and 6060 grades are directly compatible with a 1050 grade aluminum conventionally used for a casing, this compatibility ensuring continuous electrical conduction at a low electrical resistivity that is relatively close to that of the 1050 grade.

The 5754 and 6060 grades of aluminum are moreover compatible with laser welding to one of the walls of the casing, i.e. either to the cover or to the bottom of the casing. Specifically, the metallic structures of these various grades, i.e. 5754, 1050 and 6060, of aluminum are sufficiently similar to ensure the laser welds produced are of high quality. With laser welding of an output terminal made of aluminum alloy according to the invention, the assembly process is simple, as it implements only the two parts, namely the output terminal and the casing, and does not require a filler material to be used during the operation.

The inventors of the present invention have overcome a technical prejudice by employing a positive output terminal made of an aluminum alloy to produce a reliable electrical and mechanical connection to an interconnecting strip (bus bar). Specifically, the general opinion of specialists in the field of Li-ion accumulators was that output terminals could only be made of copper, as is abundantly clear from the patent application EP 1 653 530 A1 mentioned in the preamble.

According to one advantageous feature, the output terminal welded to the casing is the positive terminal.

According to one advantageous variant, the output terminal welded to the casing is covered with a layer of nickel (Ni), preferably of thickness comprised between 2 and 20 microns. Such a layer of Ni makes it possible to prevent a layer of alumina forming on the surface of the output terminal according to the invention, which layer of alumina is liable to adversely affect the electrical properties of the aluminum contact.

Advantageously, the other output terminal is fastened by crimping or screwing through a wall of the casing.

The other output terminal is preferably made of copper (Cu) covered with a layer of Ni or of a Cu—Ni-based alloy or of an aluminum-based alloy.

The casing may be of generally cylindrical or prismatic shape.

The accumulator may advantageously constitute an Li-ion accumulator. In the latter case, the output terminal welded to the casing, according to the invention, is the positive output terminal.

Another subject of the invention according to another of its aspects is a battery, referred to as a battery pack, including a plurality of accumulators such as just described, said accumulators being connected together in electrical parallel or series, at least the positive output terminals of said accumulators being connected pairwise by means of a metal strip, referred to as a bus bar, fixed by screwing to each of the terminals.

The clamping torque applied to each of the output terminals is preferably higher than 4 N.m.

Lastly, another subject of the invention according to another of its aspects is a process for producing an accumulator as claimed in one of the preceding claims, including the step i/ consisting in welding and preferably laser welding the output terminal made of aluminum alloy to the cover or to the bottom of the casing.

Thus, the welding step i/ is carried out by means of a laser around the entire periphery (360°) of the edge of the output terminal bearing against the planar face of the casing bottom or cover.

According to one advantageous variant, the step i/ is carried out by means of a laser, the base of the terminal having an inclined profile with respect to the axis X1 along which the output terminal extends, so as to prevent the reflection at 180° of a beam coming from the laser. In other words, the inclination of the profile at a certain nonzero angle different from 90° with respect to the axis X1 of the output terminal makes it possible to prevent the reflection of the laser beam toward the lens of its optical system.

Depending on the type of lithium-insertion electrode materials chosen for the constituent electrodes of an electrochemical cell according to the invention, the current collector formed by at least one metal sheet may be made of aluminum or have its surface metallized with another metal, for example aluminum superposed on copper.

The expression "electrode made of lithium-insertion material" is understood here and in the context of the invention to mean an electrode including at least one lithium-insertion material and at least one binder made of polymer. Optionally, the electrode may in addition comprise an electronic conductor, for example carbon fibers or carbon black.

The expression "lithium insertion material" is, in particular for the positive electrode, understood here and in the context of the invention to mean a material chosen from spinal lithiated oxides containing manganese, lamellar lithiated oxides, and mixtures thereof, and polyanionic framework lithiated oxides of formula $LiM_y(XO_z)_n$ where M represents an element chosen from Mn, Fe, Co, Ni, Cu, Mg, Zn, V, Ca, Sr, Ba, Ti, Al, Si, B and Mo, and X represents an element chosen from P, Si, Ge, S and As, y, z and n being positive integers.

The expression "lithium insertion material" is also, in particular for the negative electrode, understood to mean a material chosen from: a lithiated or non-lithiated titanium oxide, for example $Li_4Ti_5O_{12}$ or $TiO_2$. More particularly, the negative electrode material may be chosen from carbonated materials, non-lithiated titanium oxides and their derivatives and lithiated titanium oxides, such as $Li_4Ti_5O_{12}$, and their derivatives, and a mixture thereof.

The expression "lithiated derivative" is here and in the context of the invention understood to mean compounds of formula $Li_{(4-x1)}M_{x1}Ti_5O_{12}$ and $Li_4Ti_{(5-y1)}N_{y1}O_{12}$, where x1 and y1 are respectively comprised between 0 and 0.2 and M and N are respectively chemical elements chosen from Na, K, Mg, Nb, Al, Ni, Co, Zr, Cr, Mn, Fe, Cu, Zn, Si and Mo.

The expression "non-lithiated derivative" is here and in the context of the invention understood to mean $Ti_{(5-y1)}N_{y1}O_{12}$, where y1 is comprised between 0 and 0.2 and N is a chemical element chosen from Na, K, Mg, Nb, Al, Ni, Co, Zr, Cr, Mn, Fe, Cu, Zn, Si and Mo.

Preferably, the anodes are made of $Li_4Ti_5O_{12}$ and the cathodes of $LiFePO_4$.

The term "separator" is here and in the context of the invention understood to mean an electrically insulating ionic conductor formed by at least one polymeric material such as polyvinylidene fluoride (PVDF), polyvinyl acetate (PVA), polymethyl methacrylate (PMMA), polyoxyethylene (POE) or polyethylene terephthalate (PET) or a polymer chosen from the polyolefins such as polypropylene, polyethylene and cellulose.

The electrolyte according to the invention may be a liquid formed by a mixture of a carbonate and at least one lithium salt. The expression "lithium salt" is preferably understood to mean a salt chosen from $LiPF_6$, $LiClO_4$, $LiBF_4$ and $LiAsF_6$.

Alternatively, the electrolyte may comprise one or more ionic liquids based on lithium ions, namely a salt formed from lithium cations complexed with organic or inorganic anions, which has the property of being a liquid at room temperature. An ionic liquid, depending on the nature of the anion, may be hydrophilic or hydrophobic. By way of example of ionic liquids, mention may be made of ionic liquids based on hydrophobic anions such as trifluoromethanesulfonate $(CF_3SO_3)$, bis(trifluoromethanesulfonate)imide $[(CF_3SO_2)_2N]$ and tris(trifluoromethanesulfonate)methide $[(CF_3SO_2)_3C]$.

Each electrode may be deposited on the electrically conductive portion forming a current collector of at least one of the devices by a conventional printing technique such as screen printing, rotogravure printing, flexographic printing, spray coating, etc.

DETAILED DESCRIPTION

Other advantages and features will become more clearly apparent on reading the detailed description that is given by way of illustration and with reference to the following figures, in which:

FIGS. 6 and 6A are perspective and cross-sectional photographic reproductions, respectively, showing a positive output terminal according to the invention, made of an alloy of grade 6060 aluminum, such as it is welded to the casing cover of a lithium-ion accumulator;

FIG. 7 is a schematic representation of a testing device intended to measure the electrical contact resistance between a positive output terminal of an Li-ion accumulator and a copper strip representative of a bus bar;

FIG. 8 illustrates the curves of the results of tests carried out with the device in FIG. 7 both on an output terminal made of aluminum alloy according to the prior art and on output terminals according to the invention;

FIGS. 9A and 9B are perspective views of a lithium-ion accumulator with a positive output terminal according to the invention and a negative terminal, which terminals are both welded to a cover of a casing of cylindrical and prismatic shape, respectively;

FIGS. 10A to 10C are side views of a lithium-ion accumulator with a casing of cylindrical shape illustrating various variants of arrangement of a positive output terminal according to the invention welded to the casing bottom and a negative terminal welded to the casing cover;

FIGS. 11A to 11C are similar to FIGS. 10A to 10C but with a casing of prismatic shape;

FIG. 12 is a schematic view showing a battery pack of two modules in series of Li-ion accumulators according to the invention, each module consisting of four rows of accumulators in parallel, each row consisting of six accumulators in series.

For the sake of clarity, the same references have been used to designate the same elements of a lithium-ion accumulator according to the prior art and according to the invention in all of FIGS. 1 to 12.

It will be noted that the various elements according to the invention are shown merely for the sake of clarity and that they are not to scale.

Lastly it will be noted that here and throughout the present application, the terms "lower", "upper", "vertical", "raised", "lowered", "below" and "above" are to be understood with reference to an Li-ion accumulator in vertical position with its cover on the top end of the casing.

Figure 1:
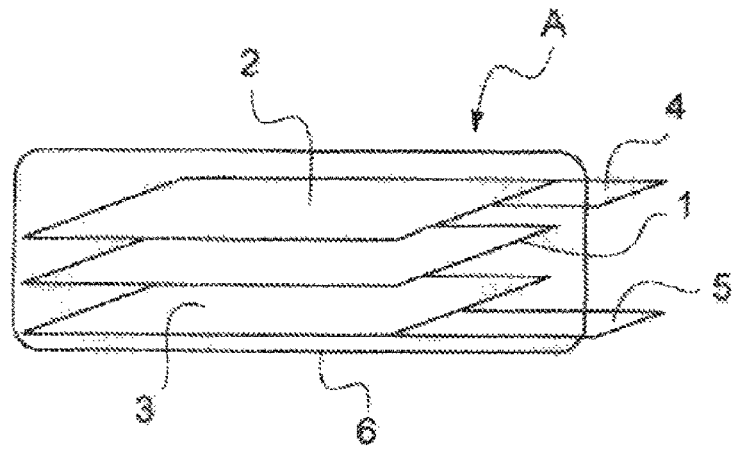
FIG. 1 is an exploded perspective schematic view showing the various elements of a lithium-ion accumulator.
Figure 2:
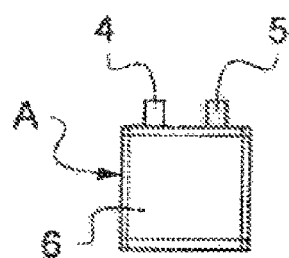
FIG. 2 is a front view showing a lithium-ion accumulator with its flexible packaging according to the prior art.
Figure 3:
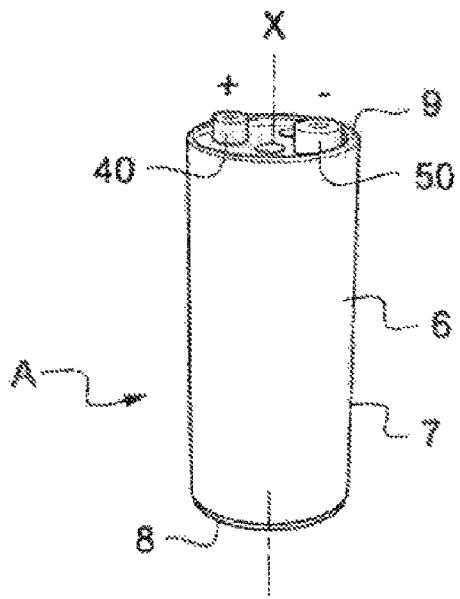
FIG. 3 is a perspective view of a lithium-ion accumulator according to the prior art with its rigid packaging consisting of a casing of cylindrical shape.

FIGS. 1 to 3 have already been discussed in detail in the preamble. They are therefore not described below.

Figure 4:
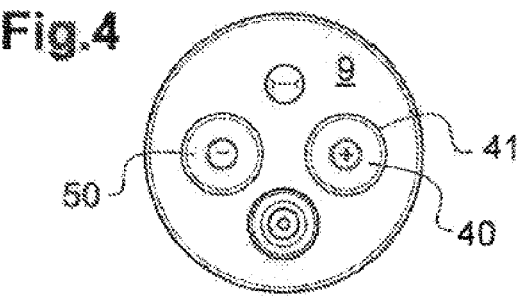
FIG. 4 is a top view of the casing cover of a lithium-ion accumulator with a positive output terminal according to the invention.

A lithium-ion accumulator A according to the invention has been shown in FIG. 4.

The accumulator A firstly includes at least one electrochemical cell C (not shown) consisting of at least one anode and one cathode on either side of an electrolyte impregnated in a separator.

The anode and cathode are made of lithium-insertion material and may be deposited, using a conventional technique, in the form of an active layer on a metal sheet forming a current collector. By way of example, the anode is made of $Li_4Ti_5O_{12}$, the cathode of $LiFePO_4$ and the current-collector sheets of aluminum.

The Li-ion accumulator includes two current collectors one of which is connected to the anode and the other to the cathode of each cell C.

By way of rigid packaging, the accumulator includes a casing 6 of a shape that is elongate along a longitudinal axis (X).

The casing 6 includes a cylindrical lateral jacket 7 and a bottom 8 forming a container, and a cover 9 assembled by crimping and welding to the container at the opposite end to the bottom 8.

The cover 9 bears the terminals or poles 40, 50 through which the current is output.

One of the output terminals (poles), for example the positive terminal 40, is welded to the cover 9 whereas the other output terminal, for example the negative terminal 50, passes through the cover 9 with interposition of a seal (not shown) that electrically insulates the negative terminal 50 from the cover.

The casing 6, i.e. the container formed by the jacket 7 and the bottom 8, and the cover 9, are all made of an alloy of 1050 aluminum.

According to the invention, the positive terminal 40 is made of an aluminum alloy comprising a magnesium (Mg) content lower than or equal to 4%, and a copper content lower than or equal to 0.3%, the aluminum alloy having a metallurgical state providing it with a yield strength (Rm) higher than or equal to 160 MPa.

With such values, as explained below, the inventors have been able to prove that it is possible to produce a reliable electrical and mechanical connection with a metal interconnecting strip screwed to the positive terminal 40.

Figure 4A:
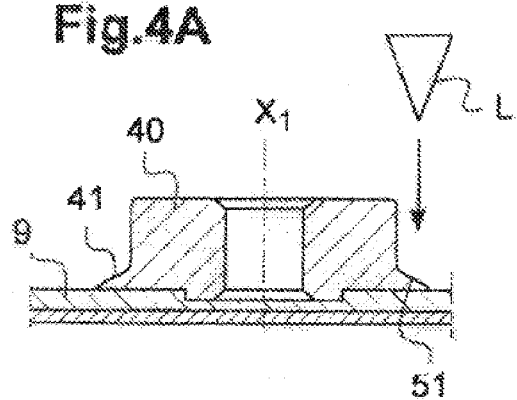
FIG. 4A is a cross-sectional detailed view of a positive output terminal according to the invention showing the step of its welding to the casing cover of an Li-ion accumulator.

To weld the positive terminal 40 made of aluminum alloy according to the invention to the cover 9 of the casing 6, laser welding was performed as shown in FIG. 4A.

The positive terminal 40 is placed in abutment against the planar face of the cover 9 beforehand.

The beam of a laser L is then directed toward the base 41 of the terminal 40 as symbolized by the downward arrow in FIG. 4A.

As illustrated, the profile of the base 41, which profile is inclined with respect to the axis X1 along which the output terminal extends 40, is adapted to prevent the reflection 180° of a beam coming from the laser. Thus, reflection of the laser beam toward the lens of its optical system is prevented. The entire periphery (360°) of the base 41 is laser welded.

Figure 4B:
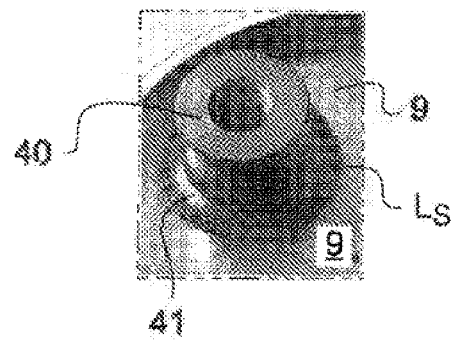
FIG. 4B is a perspective photographic reproduction showing a positive output terminal according to the invention such as it is welded to the casing cover of a lithium-ion accumulator.

The terminal 40 is thus welded via its base 41 along the weld line Ls to the cover 9, as illustrated in FIG. 4B.

Figure 5:
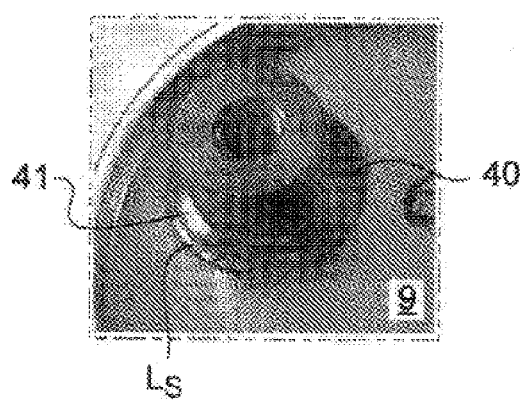
FIGS. 5 and 5A are perspective and cross-sectional photographic reproductions, respectively, showing a positive output terminal according to the invention, made of an alloy of grade 5754 aluminum, such as it is welded to the casing cover of a lithium-ion accumulator.
Figure 5A:
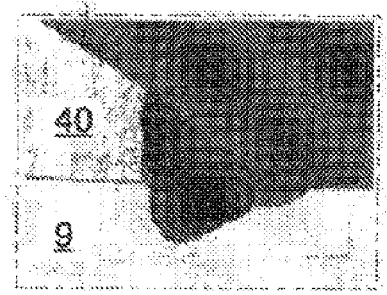

FIGS. 5 and 5A illustrate the welding of a positive terminal 40 made of an alloy of grade 5754 aluminum. The penetration depth of the weld was measured to be 0.286 mm and the cross section of flow of the current is equal to 22.4 $mm^2$.

FIGS. 6 and 6A illustrate welding with an alloy of 6060 grade aluminum. The penetration depth of the weld was measured to be 0.169 mm and the cross section of flow of the current is equal to 17.1 mm².

Tests were carried out to characterize the clamping torque of threads tapped in positive terminals 40 according to invention, which terminals were each welded to a casing 6 made of 1050 grade aluminum.

The results are given in the table below for an alloy of grade 5754 aluminum and one of grade 6060.

| Al alloy positive terminal 40 | Clamping screw diameter | Tap length in mm | Value of the clamping torque in N · m |
|---|---|---|---|
| 5754 | M5 | 6 | 6.14 |
| | | 6 | 8.01 |
| | | 6 | 8.08 |
| | | 8 | 8.3 |
| | | 8 | 9.82 |
| | | 8 | higher than 9.3 |
| | | 10 | higher than 11.4 |
| | | 10 | higher than 10 |
| | | 10 | higher than 10 |
| 6060 | | 6 | higher than 3.6 |
| | | 6 | 7.5 |
| | | 6 | 7.24 |
| | | 8 | 10.4 |
| | | 8 | higher than 10 |
| | | 8 | higher than 10 |
| | | 10 | higher than 10.3 |
| | | 10 | higher than 10 |
| | | 10 | higher than 10 |

These results show that it is possible to envision clamping torques of about or higher than 4 N·m with a conventional M5 screw.

Tests for characterizing the contact resistance between the surface of a positive terminal 40 and that of a strip made of nickel-coated copper representative of a bus bar, as a function of the nature of the aluminum material of the positive terminal and of the clamping torque obtained by screwing using an M5 screw, were also carried out.

The testing device used is shown in FIG. 7: a strip 10 made of nickel-coated copper is clamped by screwing to the positive terminal 40 welded to a cover 9 of an Li-ion accumulator. It is clarified here that the clamping screw used is an M5*8 BHC screw, a washer of trade name Onduflex and a Z5 steel washer being interposed between the screw and the positive terminal 40. The same screw washers are used to clamp an electrical supply wire to the negative terminal 50.

Another electrical supply wire is fastened to the strip 10.

To carry out the tests, the strip 10 was supplied electrically using a supply 21 delivering a high current of 200 A, then the electrical potential between the strip 10 and the positive terminal 40 was measured using a voltmeter 20, this allowing by calculation the contact resistance between the two parts to be deduced therefrom.

The results of the test are illustrated in the form of curves in FIG. 8 for positive terminals 40 made of 5754 and 6060 alloys according to the invention and, by way of comparison, for a terminal 40 made of 1050 alloy.

From these characterization tests it is possible to conclude that it is clearly possible to decrease the contact resistance between a copper strip 10 and the surface of a positive terminal 40 made of an alloy of 5754 or 6060 aluminum with clamping torques higher than 5 N·m.

Furthermore it will be noted that, with a positive terminal 40 made of an alloy of 1050 Al, it is not possible under the same test conditions to carry out clamping with a clamping torque higher than 5 N·m without irreversible degradation of the threads of its tap.

The assembly by laser welding of the base 41 of inclined profile of the output terminal 40 to a wall of the housing is simple to implement and allows the various following arrangements to be envisioned:

positive terminal 40 made of aluminum alloy according to the invention and negative terminal 50 both supported by the cover 9 of a casing 6 of cylindrical shape (FIG. 9A) or prismatic shape (FIG. 9B);

positive terminal 40 made of aluminum alloy according to the invention supported by the bottom 8 of a casing 6 and negative terminal 50 supported by the cover 9 of a casing 6 of cylindrical shape, with the negative terminal 50 shifted laterally relative to the axis X of the casing 6 and the positive terminal on the axis X of the casing 6 (FIG. 10A), or both positive and negative terminals 40, 50 on the axis X of the casing (FIG. 10B), or both positive and negative terminals 40, 50 shifted laterally from the axis X of the casing (FIG. 10C);

positive terminal 40 made of aluminum alloy according to the invention supported by the bottom 8 of a casing 6 and negative terminal 50 supported by the cover 9 of a casing 6 of prismatic shape, with the negative terminal 50 shifted laterally relative to the axis X of the casing 6 and the positive terminal on the axis X of the casing 6 (FIG. 11A), or both positive and negative terminals 40, 50 on the axis X of the casing (FIG. 11B), or both positive and negative terminals 40, 50 shifted laterally from the axis X of the casing (FIG. 11C).

The invention that was just described makes it possible to envision the production of battery packs including a plurality of Li-ion accumulators that are connected together in electrical series or parallel and at least the positive output terminals 40 of which are connected pairwise by means of a copper bus bar 10, 11, 12 fastened by screwing to each of the terminals with a screwing torque applied to each of the output terminals higher than 4 N·m.

Such a battery pack is shown in FIG. 12: it consists of two modules M1, M2 of identical Li-ion accumulators A that are connected together in series, each module M1, M2 consisting of four rows of accumulators connected in parallel, each row consisting of Li-ion accumulators that are in number equal to six.

As shown, the electrical and mechanical connection between two Li-ion accumulators of a given row is made by screwing bus bars 10 made of Cu each connecting a positive terminal 40 and a negative terminal 50. The connection between the two modules M1, M2 is ensured by a bus bar 11 made of Cu and the connection between two rows of accumulators in parallel within a given module M1 or M2 is ensured by a bus bar 12 made of Cu.

The invention is not limited to the examples described above and it is in particular possible to combine features of the illustrated examples in unillustrated variants.

Thus, although in the illustrated examples the terminal (pole) according to the invention was the positive terminal 40 of the battery, it may also be a battery pack terminal. The output terminal according to the invention may also not be connected to an electrochemical cell. It may instead be connected to components of the battery or to systems connected to the battery.

The invention claimed is:

1. An electrochemical accumulator including:
   at least one electrochemical cell consisting of at least one cathode and one anode and on either side of an electrolyte, two current collectors one of which is connected to the anode and the other to the cathode,
a casing made of aluminum alloy, arranged to contain the electrochemical cell(s) with seal tightness,
two current output terminals, one of which is welded to a wall of the casing,
the output terminal welded to the casing being made of an aluminum-based alloy comprising a magnesium (Mg) content higher than or equal to 0.01% and lower than or equal to 4%, and a copper content higher than or equal to 0.05% and lower than or equal to 0.3%,
the aluminum alloy of the output terminal welded to the casing having a metallurgical state providing it with a yield strength (Rm) higher than or equal to 160 MPa.

2. The accumulator as claimed in claim 1, the aluminum alloy of the output terminal welded to the casing being a 3003 grade with an $H_{18}$ temper.

3. The accumulator as claimed in claim 2, constituting an Li-ion accumulator.

4. The accumulator as claimed in claim 1, the aluminum alloy of the output terminal welded to the casing being a 5754 grade.

5. The accumulator as claimed in claim 1, the aluminum alloy of the output terminal welded to the casing being a 6060 grade.

6. The accumulator as claimed in claim 1, the aluminum alloy of the output terminal welded to the casing being the positive terminal.

7. The accumulator as claimed in claim 1, the aluminum alloy of the output terminal welded to the casing being covered with a layer of nickel (Ni).

8. The accumulator as claimed in claim 7, the layer of Ni having a thickness comprised between 2 and 20 microns.

9. The accumulator as claimed in claim 1, the other output terminal being fastened by crimping or screwing through a wall of the casing.

10. The accumulator as claimed in claim 1, the other output terminal being made of copper (Cu) covered with a layer of Ni or made of a Cu—Ni—based alloy or an aluminum-based alloy.

11. A battery, referred to as a battery pack, including a plurality of accumulators, wherein said accumulators are as defined in claim 1, and said accumulators are connected together in electrical parallel or series, at least the positive output terminals of said accumulators being connected pairwise by means of a metal strip, referred to as a bus bar, fixed by screwing to each of the terminals.

12. The battery as claimed in claim 11, the screwing torque applied to each of the output terminals being higher than 4 N.m.

13. A process for producing an accumulator wherein said accumulator is as defined in claim 1, including the step i/ consisting in welding the output terminal made of aluminum alloy to the cover or to the bottom of the casing.

14. The process as claimed in claim 13, the step i/ being carried out by means of a laser at the base of the terminal the inclined profile of which, with respect to the axis X1 along which the output terminal extends, is adapted to prevent the reflection at 180° of a beam coming from the laser.

* * * * *